(12) United States Patent
Puvvada et al.

(10) Patent No.: US 11,929,920 B2
(45) Date of Patent: Mar. 12, 2024

(54) MANAGING PROCESSING QUEUE ALLOCATION BASED ON ADDRESSING ATTRIBUTES OF AN INNER PACKET

(71) Applicant: VMware LLC, Palo Alto, CA (US)

(72) Inventors: Bhargav Puvvada, Pune (IN); Sourabh Bhattacharya, Pune (IN); Awan Kumar Sharma, Pune (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/467,479

(22) Filed: Sep. 7, 2021

(65) Prior Publication Data

US 2023/0028529 A1    Jan. 26, 2023

(30) Foreign Application Priority Data

Jul. 22, 2021   (IN) .............................. 202141032973

(51) Int. Cl.
*H04L 45/00* (2022.01)
*H04L 12/46* (2006.01)
*H04L 45/02* (2022.01)
*H04L 45/748* (2022.01)

(52) U.S. Cl.
CPC .......... *H04L 45/38* (2013.01); *H04L 12/4633* (2013.01); *H04L 45/04* (2013.01); *H04L 45/566* (2013.01); *H04L 45/748* (2013.01)

(58) Field of Classification Search
CPC ...... H04L 45/38; H04L 12/4633; H04L 45/04
See application file for complete search history.

(56) References Cited

U.S. PATENT DOCUMENTS

| | | | | |
|---|---|---|---|---|
| 7,215,667 | B1* | 5/2007 | Davis | H04L 63/164 |
| | | | | 370/464 |
| 10,880,121 | B1* | 12/2020 | J | H04L 12/4645 |
| 2011/0066875 | A1* | 3/2011 | Fan | H04L 12/5691 |
| | | | | 714/4.11 |
| 2013/0198302 | A1* | 8/2013 | Kinoshita | H04L 51/23 |
| | | | | 709/206 |
| 2014/0059111 | A1* | 2/2014 | Veeraiyan | H04L 67/10 |
| | | | | 709/201 |
| 2017/0099362 | A1* | 4/2017 | Almond | H04L 63/08 |
| 2020/0274819 | A1* | 8/2020 | Nahum | H04L 47/2441 |
| 2021/0320820 | A1* | 10/2021 | Ruan | H04L 49/602 |

FOREIGN PATENT DOCUMENTS

CN    110928711 A    * 3/2020

* cited by examiner

*Primary Examiner* — Chris Parry
*Assistant Examiner* — Dixon F Dabipi
(74) *Attorney, Agent, or Firm* — Quarles & Brady LLP (57) ABSTRACT

Described herein are systems, methods, and software to manage processing queue allocation based on addressing attributes of an inner packet. In one implementation, a first gateway identifies processing queues at a second gateway and assigns a unique flow label to each of the processing queues. The first gateway further receives a packet from a computing node that is directed toward the second gateway. The first gateway hashes addressing information in the packet to select a flow label, encapsulates the packet with the flow label in the outer encapsulation header for the encapsulated packet, and forwards the packet toward the second gateway.

20 Claims, 6 Drawing Sheets

MANAGING PROCESSING QUEUE ALLOCATION BASED ON ADDRESSING ATTRIBUTES OF AN INNER PACKET

RELATED APPLICATIONS

This application claims the benefit of Foreign Application Serial No. 202141032973 filed in India entitled "MANAGING PROCESSING QUEUE ALLOCATION BASED ON ADDRESSING ATTRIBUTES OF AN INNER PACKET", on Jul. 22, 2021, by VMWARE, Inc., which is herein incorporated in its entirety by reference for all purposes.

BACKGROUND

In computing networks, gateways are used to provide connectivity between different computing sites or datacenters. These gateways may be used to implement network address translation, encapsulation, encryption, firewalls, Internet Protocol Security (IPsec) tunneling, or some other operations to connect the different computing sites. The computing nodes at each of the computing sites may include physical computing systems, such as desktop computing systems, servers, and the like, and may further include virtual computing systems, such as virtual machines, containers, and the like.

In some implementations, a gateway may employ multiple queues to distribute the load for the processing system of the gateway. When a packet is received, the packet may be allocated to a queue and processed in accordance with rules and other networking configurations of the gateway. However, difficulties can arise in determining how the packets should be distributed to various queues and limiting the load associated with the individual queues.

Additionally, when an IPsec tunnel is used between the gateways, difficulties can arise in processing sequence numbers associated with the IPsec tunnel. Specifically, when the packets are distributed across multiple queues for processing, difficulties can arise in maintaining a replay window based on received sequence numbers as queues may identify sequence numbers at different rates.

OVERVIEW

The technology disclosed herein manages queue allocation for encapsulated packets between gateways. In one implementation, a first gateway is configured to identify a number or quantity of processing queues at a second gateway. The first gateway is further configured to receive a packet from a computing node and identify addressing attributes in the packet. Once identified, the first gateway may generate a flow label based on the addressing attributes and the number of processing queues at the second gateway, encapsulate the packet with the flow label in an outer header for the encapsulated packet, and communicate the encapsulated packet to the second gateway.

DETAILED DESCRIPTION

Figure 1:
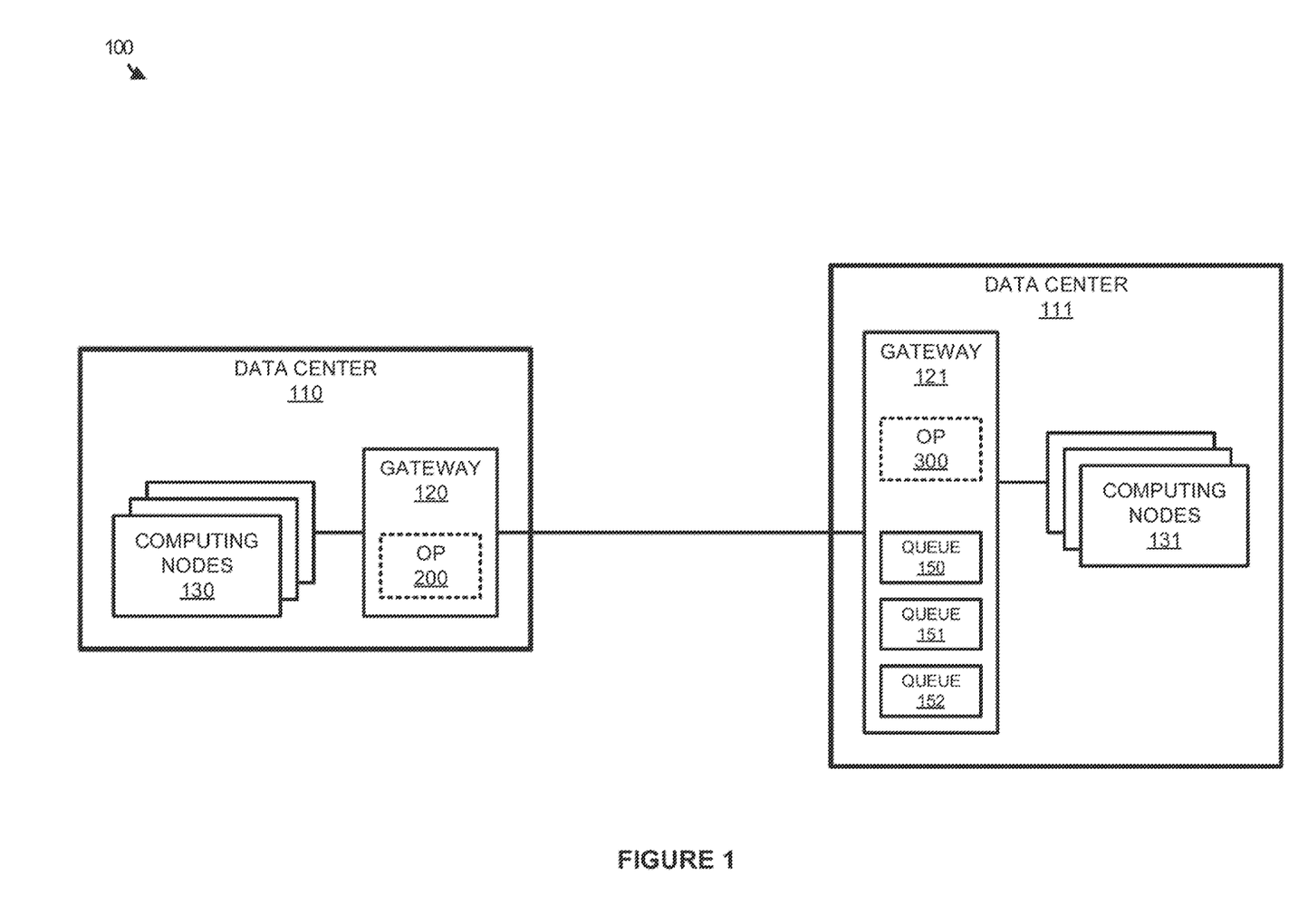
FIG. 1 illustrates a computing environment to manage processing queue allocation at a receiving gateway according to an implementation.

FIG. 1 illustrates a computing environment 100 to manage processing queue allocation at a receiving gateway according to an implementation. Computing environment 100 includes data centers 110-111, wherein data centers 110-111 further include gateways 120-121 and computing nodes 130-131. Gateway 120 provides operation 200 that is further described below in FIG. 2. Gateway 121 further includes processing queues 150-152 and provides operation 300 that is further described below in FIG. 3.

In data centers 110-111, computing nodes 130-131 are deployed to provide various operations. Computing nodes 130-131 may comprise physical computing nodes, such as desktop computers, laptop computers, servers, and the like, or may comprise virtual computing nodes, such as virtual machines, containers, or some other virtual computing node. Computing nodes 110-111 may provide user desktops, frontend applications for web servers, data processing applications for web servers, database applications, or some other service.

To provide communications between computing nodes at data center 110 and data center 111, gateways 120-121 are provided. Gateways 120-121 may be used to provide firewall operations, routing operations, encapsulation operations, or some other networking operation. In one implementation, when a computing node of computing nodes 130 sends a packet destined for a computing node at data center 111, gateway 120 may receive the packet, encapsulate the packet using at least an encapsulation header associated with a public network (i.e., internet), and forward the packet toward data center 111. Once received, data center 111 may decapsulate the packet and forward the packet to the corresponding destination computing node.

Here, in addition to providing the encapsulation operations for an egress packet to data center 111, gateway 120 may select a processing queue for processing the packet at gateway 121. In some implementations, gateway 121 may communicate information about the number of processing queues available to process ingress packets. A processing queue may correspond to a core of the CPU at the gateway, may correspond to a processor, or may correspond to some other division of processing resources. Once the number of available queues is identified by gateway 120, gateway 120 may generate a flow labels that are used to direct packets to the different processing queues at gateway 121. In generating a flow label for packets directed at gateway 121, gateway 120 may identify addressing information in a received packet from a computing node of computing nodes 130. The addressing information may include source and destination IP address information, source and destination port information, protocol, or some other addressing information. When a packet is received, gateway 120 may hash the addressing information to identify a flow label associated with the addressing information. A hash is any function that can be used to map data, such as the addressing information, to fixed-sized values. In some examples, the hash may directly map the addressing information to the flow label. In other implementations, the hash may calculate a first value then perform mathematical operations to determine the flow label. The mathematical operations may include dividing the first value by the number of available processing queues to determine a remainder value, then select the remainder value as the flow label. Once the flow label is determined, the packet is encapsulated with the selected flow label in the encapsulation header and forwarded to gateway 121. When received, gateway 121 may identify the flow label in the header and forward the packet to the corresponding processing queue of processing queues 150-152. Here, because gateway 121 includes three processing queues three flow identifiers may be used by gateway 120 to select the processing queue for the receiving gateway. (e.g., 0, 1, and 2). Thus, if an encapsulated packet is received with a flow identifier of 0, the packet may be forwarded to processing queue 150, while an encapsulated packet with a flow identifier of 2 may be forwarded to processing queue 152.

Figure 2:
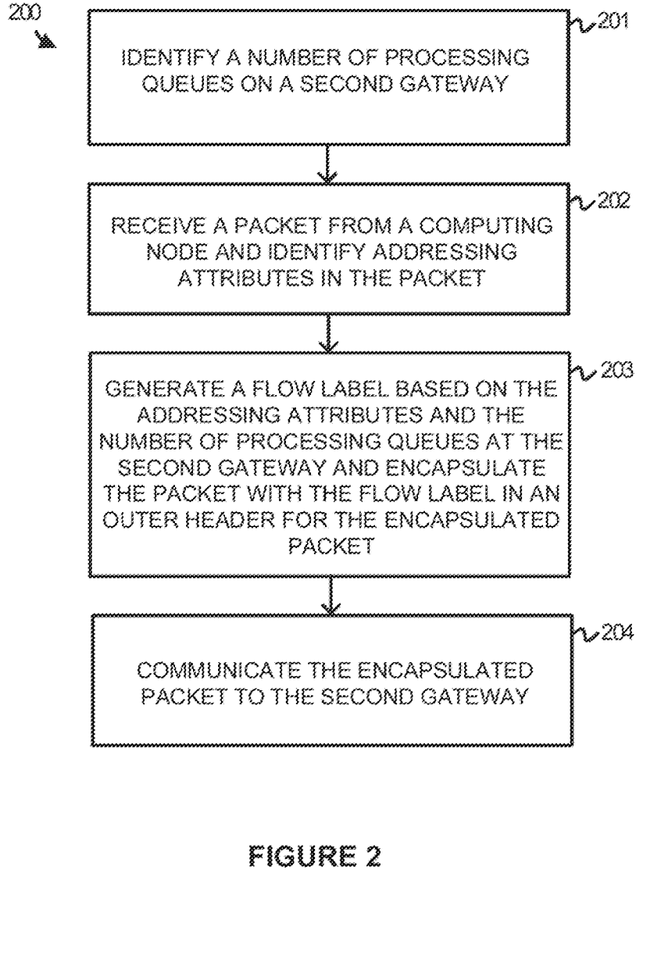
FIG. 2 illustrates an operation of a gateway to encapsulate a packet with a flow label according to an implementation.

FIG. 2 illustrates an operation 200 of a gateway to encapsulate a packet with a flow label according to an implementation. The steps of operation 200 are referenced parenthetically in the paragraphs that follow with reference to systems and elements of computing environment 100 of FIG. 1. Although demonstrated as sending a packet from gateway 120, gateway 121 may perform similar operations in sending a packet.

As depicted, operation 200 includes identifying (201) a number or quantity of available processing queues on a second gateway. In some implementations, gateways 120-121 may exchange information about the available processing queues for ingress packets. For example, gateway 121 may provide an indication to gateway 120 that three processing queues 150-152 are available for processing ingress packets.

After allocating the flow labels to the various processing queues, operation 200 receives (202) a packet from a computing element and identifies addressing attributes in the packet. Operation 200 further generates (203) a flow label based on the addressing attributes and the number of processing queues at the second gateway. In one implementation, computing nodes 130 and other networking devices such as physical and logical routers and switches may direct packets to gateway 120 that are required to be communicated to data center 111 and gateway 121. When a packet is received, gateway 120 may apply a hash to addressing attributes in the packet, wherein the addressing attributes may include the 5 tuple for the packet. The 5 tuple includes the source and destination IP addresses, the source and destination ports, and the protocol for the packet. In some examples, the addressing information may include a portion of the 5 tuple or may include any other addressing information in the packet received from the computing node. When hashing the addressing attributes, the hash may directly map the addressing attributes to the flow label. In other implementations, the addressing information may be hashed into a first value and one or more other functions can be applied to identify the required flow label. For example, the addressing information may be hashed into a first value and divided by the number of processing queues at the second gateway, wherein the remainder (if any) may be used as the flow label for the packet. In some examples, each possible generated flow label may correspond to a numerical value that can be represented in the encapsulation header for a packet. For example, processing queue 150 may be allocated a flow label of 0, processing queue 151 may be allocated a flow label of 1, and processing queue 152 may be allocated a flow label of 2. In this example, addressing attributes for a packet may be hashed to determine a first value and divided by three to determine a remainder value. The remainder value may then be used as the flow label. In some examples, hash may not always be required as the addressing attributes themselves may be treated as the first value that is divided to generate the flow label associated with the packet.

Once the flow label is identified for the packet, the packet is encapsulated with the flow label in an outer header for the encapsulated packet and operation 200 communicates (204) the encapsulated packet to the second gateway. In some implementations, the encapsulation header may include a portion of bits that can be used to include the flow label. Thus, when a packet is received at the second gateway, the second gateway may identify a processing queue to for the packet using the outer header without decapsulating the packet.

Figure 3:
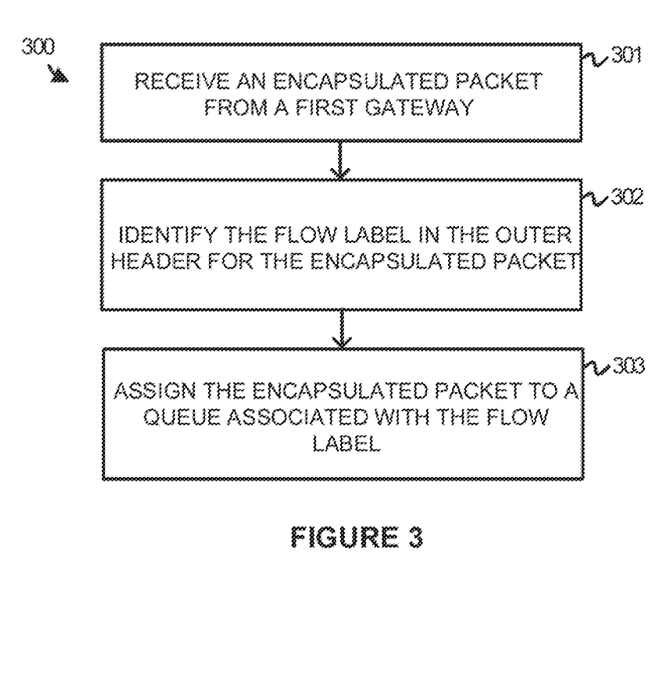
FIG. 3 illustrates an operation of a gateway to receive an encapsulated packet and assign the packet to a processing queue according to an implementation.

FIG. 3 illustrates an operation 300 of a gateway to receive an encapsulated packet and assign the packet to a processing queue according to an implementation. The steps of operation 300 are referenced parenthetically in the paragraphs that follow with reference to systems and elements of computing environment 100 of FIG. 1. Although demonstrated as receiving an encapsulated packet at gateway 121, similar operations may be performed by gateway 120 when receiving a packet from gateway 121.

As described herein, gateway 120 may use flow labels to identify processing queues for packets when they are received at gateway 121. Here, operation 300 receives (301) an encapsulated packet from a first gateway. In response to receiving the encapsulated packet, operation 300 identifies (302) a flow label in the outer header for the encapsulated packet and assigns (303) the encapsulated packet to a queue based on the flow label. As an example, gateway 120 may communicate an encapsulated packet that is received by gateway 121. Gateway 121 may identify a flow label in the encapsulated packet and determine a processing queue of processing queues 150-152 that corresponds to the flow label. Once the processing queue is identified, the encapsulated packet may be placed in the corresponding queue. In some implementations, the hashing of the packets may be used to evenly distribute the packets across the queues. In some implementations, the hashing may be used to direct specific addressing attributes to different processing queues.

In at least one example, the encapsulation between gateways 120-121 may comprise IPsec encapsulation. IPsec encapsulation uses a sequence number field to avoid replay attacks and issues. Specifically, the sequence number is used to provide a replay window that limits what packets are accepted at the receiving gateway. For example, a replay window may be 100 and the highest sequence number received may be 300. Accordingly, the replay window may be used to accept packets with a sequence number of 201 or higher.

Here, because the packets received from gateway 120 may be processed using different processing queues, the sequence number may be different and unique to each of the processing queues. To support IPsec, gateway 120 may use a first portion of the sequence number bits in the IPsec header to indicate the flow label or processing queue for the packet, while a second portion of the sequence number bits in the IPsec header may indicate the sequence number associated with the flow label. For example, the sequence number portion of the IPsec header may include 32 bits, where a first 8 bits may be used for the flow label and the remaining 24 bits may be used for the sequence number associated with the flow label. When a packet is received by gateway 120, gateway 120 may determine whether the sequence number associated with the flow label is below the replay window for the flow label. If it is below the replay window, then the packet is dropped. If it is above the replay window, the packet may be processed by the corresponding processing queue, wherein the processing may include decapsulating the packet, authenticating the packet, or providing some other operation in association with the packet. In some implementations, when the sequence number for the flow label is higher than a currently highest sequence number received in association with the flow label, the newly received sequence number can be used to update the replay window or increase the replay window from a first range to a second range. This range or replay window may rollover when the sequence number exceeds the available number of bits for the flow label. In some examples, this can be accomplished using an extended sequence number, wherein an indication is provided in the packet that a rollover has occurred.

In some implementations, gateway 121 may update one or more data structures to associate flow labels with processing queues as flow labels are identified from gateway 120. For example, gateway 120 may communicate a first packet with a first flow label and gateway 121 may associate the first flow label to processing queue 150. Subsequently, gateway 120 may communicate a second packet with a second flow label and gateway 121 may associate the second flow label to processing queue 151. This process of associating flow labels to processing queues at the receiving gateway may be repeated as necessary for the number of processing queues available on the receiving gateway. In other implementations, rather than discovering the flow labels as packets are received, gateway 120 may indicate the flow labels that will be used for the processing queues on the receiving gateway.

Figure 4:
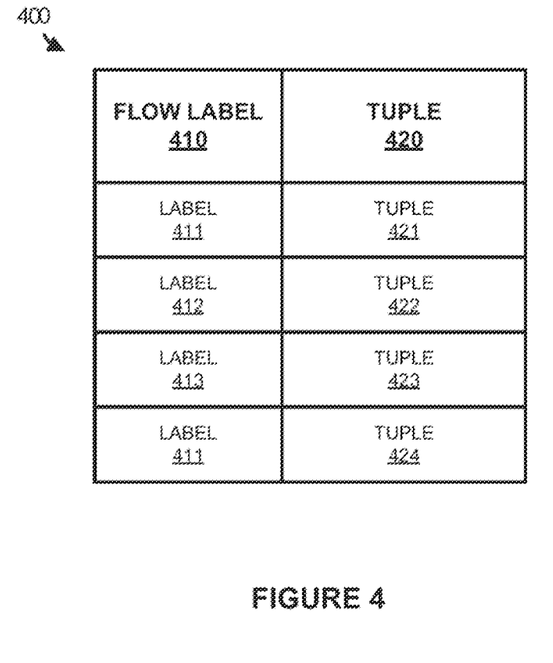
FIG. 4 illustrates a data structure to manage associations between flow labels and tuples according to an implementation.

FIG. 4 illustrates a data structure 400 to manage associations between flow labels and tuples according to an implementation. Data structure 400 includes columns for flow label 410 and tuple 420. The column for flow label 410 includes labels 411-413, wherein the labels may comprise any value that can be represented as bits in the encapsulation header. In some implementations, each of the flow labels may comprise incremented values that are each associated with a different processing queue for the receiving gateway. For example, if three processing queues were identified for a receiving gateway, the sending gateway may associate three incremented values to the processing queues (e.g., 0, 1, and 2). As tuples are identified in packets from computing nodes, which may include source and destination IP addresses, source and destination ports, protocols, and the like, the tuples may be hashed to generate a corresponding flow label from flow labels 411-413. Thus, when tuple 421 is first identified in a packet, the tuple for the packet may be hashed to identify a corresponding flow label 411. Subsequent packets with the same tuple may then include the same flow label in the encapsulation header for the packet without requiring the hash of the tuple.

In at least one implementation, the sending gateway may check a data structure, such as data structure 400, to determine whether a flow label has been identified or generated for the tuple. If a flow label has been identified, then the flow label may be added to the encapsulation header for the packet. In contrast, if a flow label has not been identified for the tuple (or addressing information used for the hash) the hash may be performed on the tuple and the identified flow label may be added to the data structure. Flow labels may be associated with multiple tuples, which is demonstrated by flow label 411 being assigned to both tuple 421 and 424.

In some examples, data structure 400 or some other data structure may include additional information associated with each of the flow labels. For example, the tunnel between gateways may be an IPsec tunnel that includes a header field for sequence number that is used to limit replay attacks on the destination gateway. To support the IPsec tunnel and multiple processing queues, the sequence number field in the IPsec header may be divided into multiple portions. A first portion may be assigned to indicate the flow label, while a second portion may be assigned to indicate the sequence number associated with the flow label and processing queue. Accordingly, when a packet is received, the receiving gateway may compare the sequence number for the flow label to a replay window for the flow window to determine how to handle the packet. If the flow label is less than the replay window, then the packet will be dropped. If the flow label is not less than the replay window, then the packet may be placed in the processing queue to be decapsulated, authenticated, or provide some other operation prior to forwarding the packet to the destination computing node. In some examples, if the sequence number in the packet exceeds a current highest sequence number received in association with the flow label, then the new highest sequence number may be used shift the replay window associated with the flow label. The replay window may also rollover when bits are no longer available in the header to increase the sequence number.

Data structure 400 is one example of associating flow labels with tuples, other types of data structures may be used including linked lists, arrays, or some other data structure. The data structure may be maintained such that future packets that share the same addressing attributes will be assigned to the same flow label.

Figure 5:
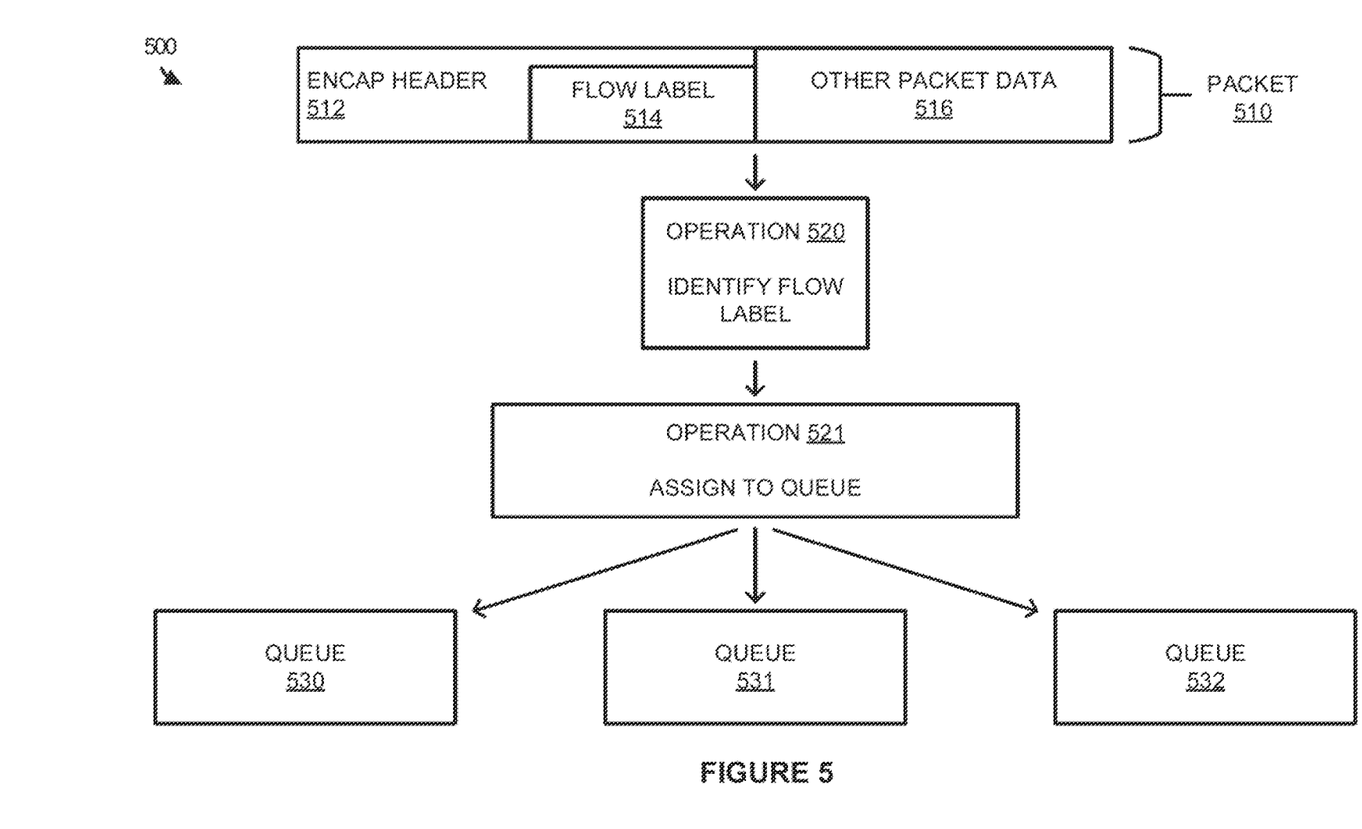
FIG. 5 illustrates an operational scenario of allocating a packet to a processing queue according to an implementation.

FIG. 5 illustrates an operational scenario 500 of allocating a packet to a processing queue according to an implementation. Operational scenario 500 includes packet 510, operations 520-521, and processing queues 530-532. Packet 510 is representative of an encapsulated packet that is received from another gateway and may comprise an IPsec packet in some examples.

As described herein, when a packet is received from a computing node in a first data center that is destined for a computing node in a second data center, the packet may be encapsulated using an encapsulation outer header. The outer header may include public IP addressing and port information, sequence numbers, or some other information. Here, the outer header further includes a flow label that is dictated by the addressing information included in the packet from the computing node. The addressing information may include source and destination IP addressing, source and destination port, protocol, or some other information in the packet received from the computing node. When the packet is received by the sending gateway, the sending gateway may hash the addressing information to determine a flow label, wherein the flow label corresponds to a processing queue at the receiving gateway. In at least one implementation, the receiving gateway may communicate information about the available processing queues to the sending gateway and the sending gateway may generate flow labels for packets based on the addressing information in the packets and the available processing queues at the receiving gateway. Here, flow label 514 is generated by the sending gateway based on addressing attributes in the packet and the three available queues at the receiving gateway. This flow label may be generated in some examples by hashing the addressing attributes to determine a first value and dividing the first value by three to determine a remainder value. The remainder value can then be used as the flow label.

When the packet is received, the receiving gateway may perform operation 520 to identify the flow label in the outer header of the packet, wherein the flow label may be found in an allocated number of bits of the outer header. In response to identifying the flow label, the receiving gateway may perform operation 521 to assign the packet to a processing queue. As described previously, each of the flow labels may be associated with an available queue to process the received packet. For example, each queue of processing queues 530-532 may be associated with a different flow label. If flow label 514 corresponds to processing queue 530, then the packet may be placed in processing queue 530, wherein the processing core associated with processing queue 530 may be used to decapsulate the packet, authenticate the packet, or provide some other operation in association with packet 510.

Figure 6:
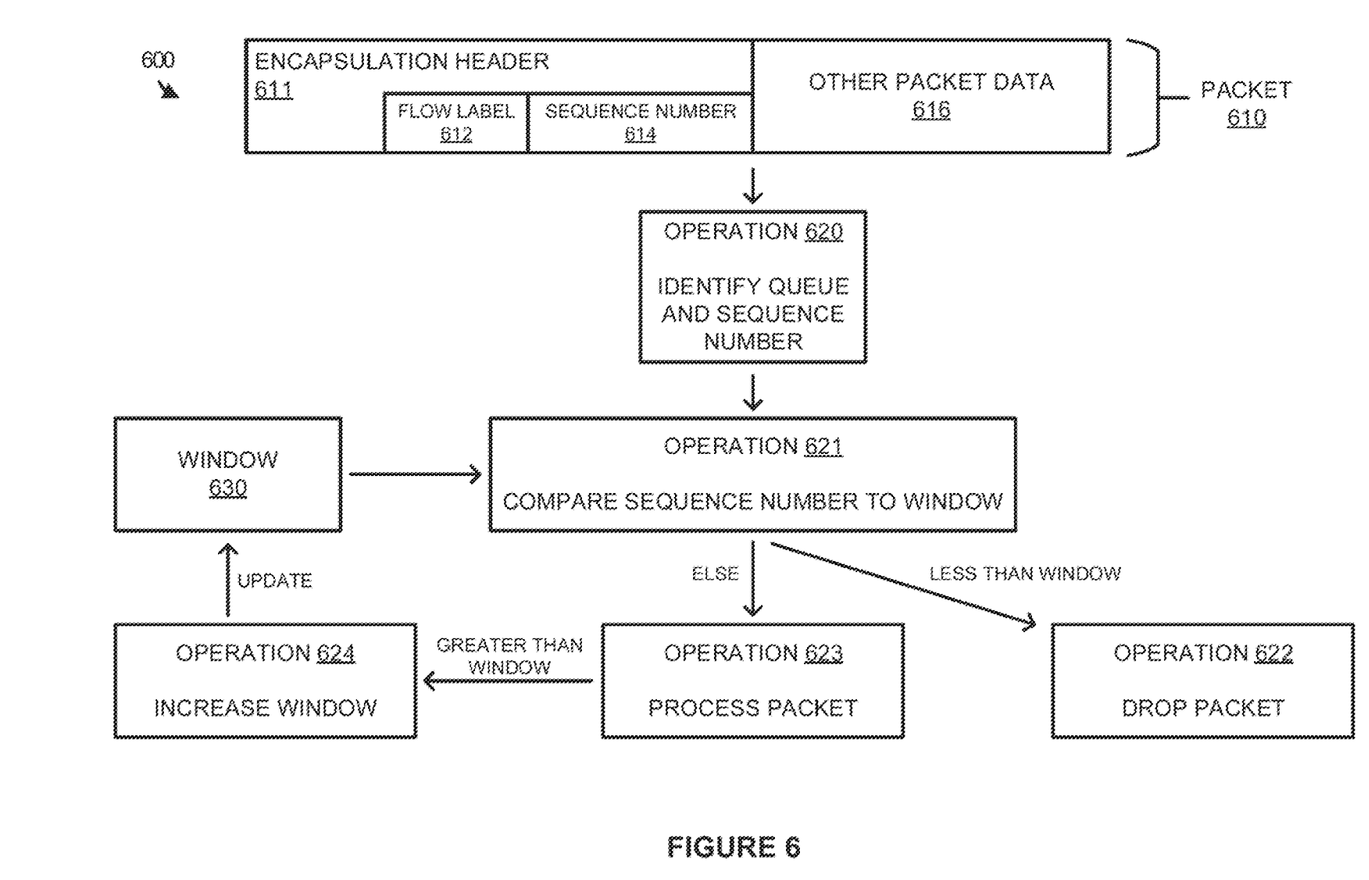
FIG. 6 illustrates an operational scenario of updating replay windows associated with processing queues according to an implementation.

FIG. 6 illustrates an operational scenario 600 of updating replay windows associated with processing queues according to an implementation. Operational scenario 600 includes packet 610, operations 620-624, and replay window 630. Packet 610 includes encapsulation header 611 with flow label 612 and sequence number 614, and further includes other packet data 616. Other packet data 616 may include the originally received packet from a computing node at a computing site in some examples.

Packet 610 is generated by a sending gateway at first computing site or data center in response to receiving a packet from a computing node at the first computing site. In generating the packet, the sending gateway may identify a flow label 612 that corresponds to a processing queue at the receiving gateway and a sequence number 614 that indicates the order of packets from the sending gateway. In some examples, the receiving gateway may indicate to the sending gateway a quantity of available processing queues at the receiving gateway. The sending gateway may then assign a flow label to each of the available processing queues and maintain a sequence number for the packets sent in association with each of the flow labels.

Here, packet 610 is communicated with flow label 612 that corresponds to a processing queue with a sequence number 614 that corresponds to the order of packets communicated in association with the flow label. In some implementations, flow label 612 and sequence number 614 may use bits in encapsulation header 611 that correspond to an IPsec sequence number portion when the encapsulation comprises IPsec encapsulation. For example, the sequence number portion in the IPsec header may include an available 32 bits. Here, the first 8 bits may be used to identify the flow label, while the remaining 24 bits are used to identify the sequence number associated with the flow label. The sending gateway may maintain a data structure that indicates the current sequence number associated with each of the possible flow labels for the receiving gateway. The sequence number is increased for each packet that is communicated using the flow.

Once the packet is received at the receiving gateway, the receiving gateway performs operation 620 that identifies the flow label and corresponding processing queue and further identifies the sequence number associated with the flow label. After identifying the flow label and sequence number, operation 621 is performed that compares the sequence number identified in the packet to a replay window 630 associated with the flow label. The replay window may comprise a range of sequence numbers that are identified based on the highest sequence number received. For example, a replay window size may be set to 100. Thus, if the highest received sequence number for a flow label were 300, the replay window may be 201-300.

If it is determined that sequence number 614 is less than the replay window 630, operation 622 is performed that can drop the packet and prevent further processing of the packet. If it is determined that the sequence number is not less than the replay number, then operation 623 can be performed that allocates the packet to a corresponding processing queue and process the packet, wherein processing the packet may include decapsulating the packet, authenticating the packet, or performing some other operation on the packet. Additionally, if sequence number 614 is greater than the highest sequence number for replay window 630, operation 624 can be performed to update replay window 630, wherein the replay window can be shifted to a higher set of numbers.

In some implementations, the sequence number associated with a particular flow label may reach the end of the available bits to increase the sequence number. In these examples, the sequence number may rollover and the receiving gateway may permit the replay window to reflect the rollover. This may be caused by a notification in the sending packet that a replay has occurred, permitting the receiving gateway to distinguish the sequence number from any packets prior to the rollover. In at least one implementation, the rollover may be included as part of a validation or verification portion of the packet header.

Figure 7:
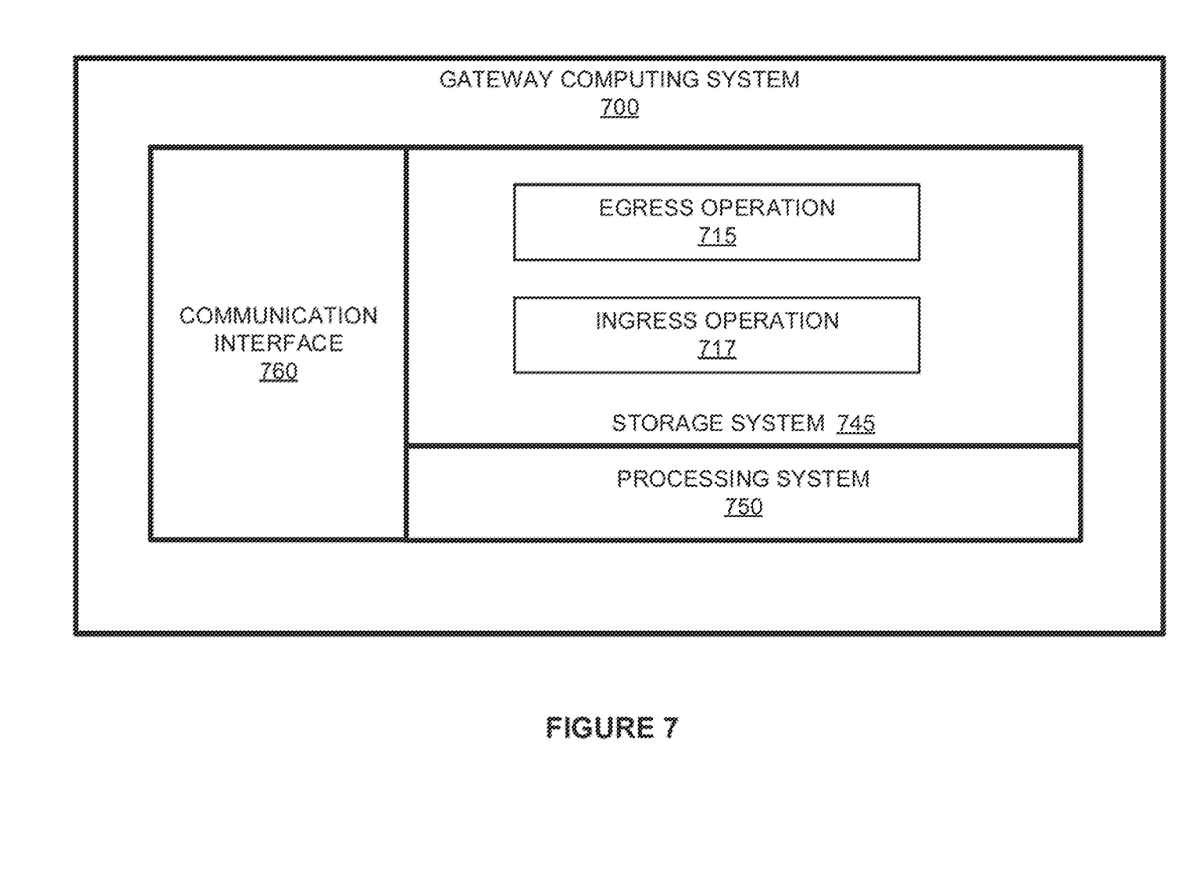
FIG. 7 illustrates a gateway computing system to manage processing queue allocation for received packets according to an implementation.

FIG. 7 illustrates a gateway computing system 700 to manage processing queue allocation for received packets according to an implementation. Computing system 700 is representative of any computing system or systems with which the various operational architectures, processes, scenarios, and sequences disclosed herein for a gateway can be implemented. Computing system 700 is an example of gateways 120-121 of FIG. 1, although other examples may exist. Computing system 700 includes storage system 745, processing system 750, and communication interface 760. Processing system 750 is operatively linked to communication interface 760 and storage system 745. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 may be configured to communicate with other gateways and may further communicate with one or more computing nodes, such as host computing systems, desktop computing systems, or some other computing system.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 750 is typically mounted on a circuit board that may also hold the storage system. The operating software of storage systems 745 comprises computer programs, firmware, or some other form of machine-readable program instructions. The operating software of storage system 745 comprises egress operation 715 and ingress operation 717. The operating software on storage system 745 may further include utilities, drivers, network interfaces, applications, or some other type of software. When read and executed by processing system 750 the operating software on storage system 745 directs computing system 700 to operate as described herein. In some implementations, compression process 715 may provide operations 200 and 300 described in FIGS. 2 and 3.

In at least one implementation, egress operation 715 directs processing system 750 to identify a number of processing queues at a second gateway, wherein the number may be provided or indicated by the second gateway. Egress operation 715 further directs processing system 750 receive a packet from a computing node at the same computing site or data center that is serviced by gateway computing system 700, wherein the packet is destined for a second computing node behind the second gateway. In response to identifying that the packet is destined for a computing node behind the second gateway, egress operation 715 identifies addressing attributes in the packet and generates a flow label based on the addressing attributes and the number of processing queues at the second gateway. In some examples, to generate the flow label, egress operation 715 hashes addressing attributes in the packet to select a flow label of the plurality of flow labels for the packet. In some implementations, the addressing attributes may comprise a 5 tuple for the packet, which includes IP addressing information, port information, and protocol information for the packet. However, addressing information may include some other combination of addressing attributes.

In some implementations, when the addressing information is hashed, the hash may directly map to a flow label of the plurality of flow labels. For example, if the destination gateway included four processing queues corresponding to four processing cores, the hash of the addressing attributes may map to a flow label of the four flow labels that correspond to the processing queues. In other implementations, after a hash is performed on the addressing attributes, one or more mathematical functions may be performed to identify the flow label. For example, a hash may identify a first value and division may be performed on the first value to identify the flow label (e.g., using the remainder from dividing the first value by the number of available queues).

Once the flow label is determined, egress operation 715 further directs processing system 750 to encapsulate the packet with the flow label in an outer encapsulation header for the encapsulated packet and communicate the encapsulated packet to the second gateway. In some implementations, the encapsulation of the packet may comprise IPsec encapsulation, wherein the flow label may be incorporated into a sequence number portion of the IPsec header. Specifically, the IPsec header includes a quantity of bits that can be used for a sequence number to limit replay attacks on a destination gateway. Here, a first portion of the available sequence number bits may be used for the flow label, while a second portion of the bits may be used for the sequence number associated with the flow label. The sequence number may be used to identify the order or sequence of packets that correspond to the individual flow label. Advantageously, when the packets are received at the second gateway, the second gateway may compare the sequence number to a replay window for the flow label to prevent replay attacks at the second gateway.

In addition to encapsulating and communicating egress packets, ingress operation 717 directs processing system 750 to manage and allocate ingress packets. In one implementation, ingress operation 717 directs processing system 750 to receive an encapsulated packet from a second gateway and identify flow label in the outer encapsulation header for the packet, wherein the flow label corresponds to a processing queue of a plurality of processing queues available at gateway computing system 700. These flow labels may be assigned by the second gateway in some examples based on information provided by gateway computing system 700 about the quantity of processing queues available. For example, if gateway computing system 700 included four available processing queues, gateway computing system 700 may indicate the available quantity of queues to the second gateway and the second gateway may assign flow labels to each of the queues.

Once the flow label is identified in the encapsulation header, the encapsulated packet may be forwarded to a processing queue associated with the flow label. For example, when a first flow label is identified (e.g., value of 0), 0 may be assigned to a first processing queue. When a second flow label is identified (e.g., value of 1), 1 may be assigned to a second processing queue. This assignment of the flow labels to the different queues may be repeated for as many processing queues are available on the gateway and may be maintained in one or more data structures. Thus, when another packet with the same flow label is identified, the packet may be forwarded to the same queue.

In some implementations, the received encapsulated packets may comprise IPsec packets that include a sequence number to prevent replay attacks at the receiving gateway. In the IPsec example, ingress operation 717 directs processing system 750 to identify the flow label in the packet and a sequence number associated with the flow label. If the sequence number falls below a replay window for the flow label, then the packet is dropped. If the sequence number does not fall below the replay window, the packet may be assigned to a processing queue associated with the flow label and the replay window may be updated if required.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a first gateway comprising:
identifying a number of processing queues at a second gateway;
receiving a packet from a computing node;
identifying addressing attributes in the packet;
generating a flow label based on the addressing attributes and the number of processing queues at the second gateway;
encapsulating the packet with the flow label in an outer header for the encapsulated packet; and
communicating the encapsulated packet to the second gateway.

2. The method of claim 1, wherein addressing attributes comprise at least a source and destination internet protocol addresses.

3. The method of claim 1, wherein generating the flow label based on the addressing attributes and the number of processing queues comprises:
hashing the addressing attributes to obtain a first value;
dividing the first value by the number of processing queues to obtain a remainder value; and;
using the remainder value as the flow label.

4. The method of claim 1 further comprising:
receiving a second packet from the second gateway;
identifying a second flow label in an outer header for the second packet, wherein the flow label corresponds to a processing queue of a plurality of processing queues at the first gateway; and
assigning the second packet to the processing queue of the first gateway.

5. The method of claim 1, wherein identifying the number of processing queues at the second gateway comprises:
receiving a notification from the second gateway indicating the number of processing queues, wherein the number of processing queues comprises at least two processing queues.

6. The method of claim 1, wherein encapsulating the packet with the flow label in the outer header for the encapsulated packet comprises:
identifying a sequence number associated with the flow label; and
encapsulating the packet with the flow label and the sequence number in the outer header of the encapsulated packet.

7. The method of claim 6, wherein the outer header comprises an IPsec header, and wherein the flow label comprises a first number of bits in a sequence number portion of the IPsec header and wherein the sequence number comprises a second number of bits in the sequence number portion of the IPsec header.

8. A computing apparatus comprising:
a storage system;
a processing system operatively coupled to the storage system;
program instructions stored on the storage system that, when executed by the processing system, direct the computing apparatus to:
identify a number of processing queues at a second gateway;
receive a packet from a computing node;
identify addressing attributes in the packet;
generate a flow label based on the addressing attributes and the number of processing queues at the second gateway;
encapsulate the packet with the flow label in an outer header for the encapsulated packet; and
communicate the encapsulated packet to the second gateway.

9. The computing apparatus of claim 8, wherein addressing attributes comprise at least a source and destination internet protocol addresses.

10. The computing apparatus of claim 8, wherein generating the flow label based on the addressing attributes and the number of processing queues comprises:
hashing the addressing attributes to obtain a first value;
dividing the first value by the number of processing queues to obtain a remainder value; and;
using the remainder value as the flow label.

11. The computing apparatus of claim 8, wherein the program instructions further direct the computing apparatus to:
receive a second packet from the second gateway;
identify a second flow label in an outer header for the second packet, wherein the flow label corresponds to a processing queue of a plurality of processing queues at the first gateway; and
assign the second packet to the processing queue of the first gateway.

12. The computing apparatus of claim 8, wherein identifying the number of processing queues at the second gateway comprises:
receiving a notification from the second gateway indicating the number of processing queues, wherein the number of processing queues comprises at least two processing queues.

13. The computing apparatus of claim 8, wherein encapsulating the packet with the flow label in the outer header for the encapsulated packet comprises:
identifying a sequence number associated with the flow label; and
encapsulating the packet with the flow label and the sequence number in the outer header of the encapsulated packet.

14. The computing apparatus of claim 13, wherein the outer header comprises an IPsec header, and wherein the flow label comprises a first number of bits in a sequence number portion of the IPsec header and wherein the sequence number comprises a second number of bits in the sequence number portion of the IPsec header.

15. A system comprising:
a first gateway at a first data center; and
a second gateway at a second data center, the second gateway configured to:
identifying a number of processing queues at the first gateway;
receiving a packet from a first computing node in the second data center directed at a second computing node in the first data center;
identify addressing attributes in the packet;
generate a flow label based on the addressing attributes and the number of processing queues at the second gateway;
encapsulating the packet with the flow label in an outer header for the encapsulated packet; and
communicating the encapsulated packet to the first gateway.

16. The system of claim 15, wherein addressing attributes comprise source and destination internet protocol addresses.

17. The system of claim 16, wherein the addressing attributes further comprise source and destination ports and protocol.

18. The system of claim 15, wherein the first gateway is configured to:
- receive the encapsulated packet from the second gateway;
- identify the flow label in the outer header for the encapsulated packet;
- assign the packet to a processing queue that corresponds to the flow label.

19. The system of claim 15, wherein identifying the number of processing queues at the first gateway comprises:
- receiving a notification from the first gateway indicating the number of processing queues, wherein the number of processing queues comprises at least two processing queues.

20. The system of claim 15, wherein encapsulating the packet with the flow label in the outer header for the encapsulated packet comprises:
- identifying a sequence number associated with the flow label; and
- encapsulating the packet with the flow label and the sequence number in the outer header of the encapsulated packet.

* * * * *